Oct. 19, 1926.
P. A. FISKER
FILTER FOR VACUUM BRUSHES
Filed August 4, 1925
1,603,674
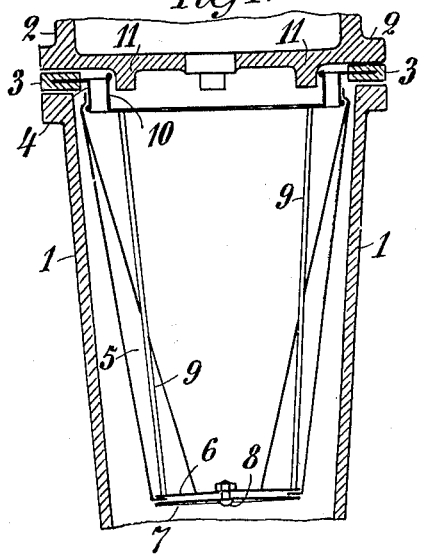
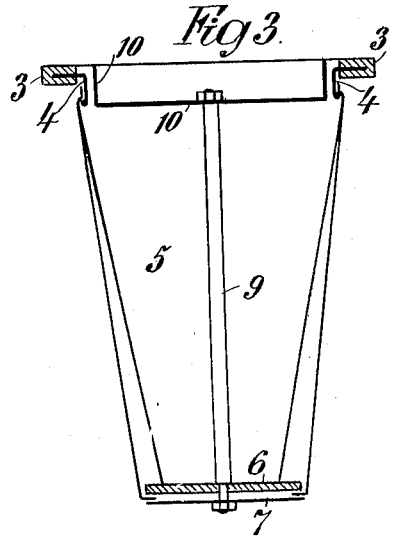
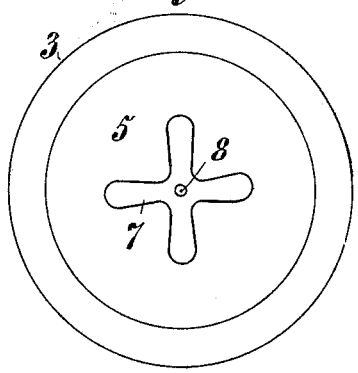
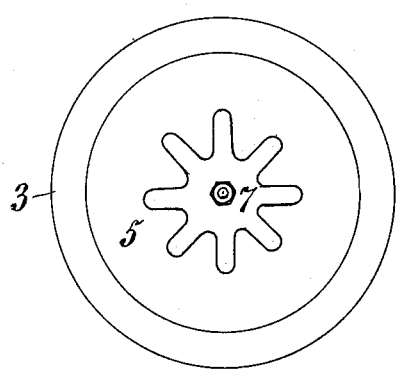
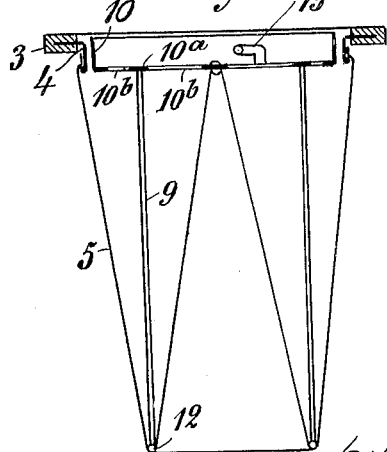
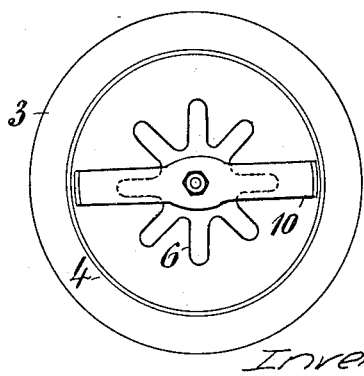
Inventor
P. A. Fisker
by Langner, Parry, Card & Langner
Attys Patented Oct. 19, 1926.

1,603,674

UNITED STATES PATENT OFFICE.

PEDER ANDERSEN FISKER, OF COPENHAGEN, DENMARK, ASSIGNOR TO A/S. FISKER & NIELSEN, OF COPENHAGEN, DENMARK.

FILTER FOR VACUUM BRUSHES.

Application filed August 4, 1925, Serial No. 48,144, and in Denmark February 4, 1924.

This invention relates to a filter for vacuum-brushes of that kind in which the essentially bag-shaped filter extends into the dust-container, the dust being filtrated from the air by the outer surface of the filter.

Until now the filters for this kind of vacuum-brushes have the drawback that they cannot be effectively cleansed without being removed from the dust-container. Inevitably a great portion of the dust adhering to the filter will be raised at the cleansing of the filter, whether this cleansing is carried out by shaking, beating, or brushing the latter.

This drawback is done away with by the present invention, according to which the filter may be turned inside out. Thus it is obtained that the filter may be turned when in connection with the dust-container, so that the side normally turning outward and upon which the dust sits, will be turned inward. By this turning the filter may be thoroughly cleansed, the dust being shaken into the dust-container without being raised into the air.

In the drawing some constructional forms of the invention are represented.

Fig. 1 is a partial sectional elevation of a vacuum-brush with a filter according to the invention.

Fig. 2 shows this filter as seen from the bottom,

Figs. 3, 4 and 5 show another constructional form of the filter, Fig. 3 being a sectional elevation, Fig. 4 a bottom view, and Fig. 5 a plan view thereof, Fig. 6 is a sectional elevation of a third constructional form of the filter.

In Fig. 1, 1 is the dust-container of the vacuum-brush and 2 is its machine housing. The filter consists of a suitable filter fabric 5, fixed at its top to a ring 4 preferably provided with a rubber coating 3 and clamped between the parts 1 and 2 or fixed to the dust-container 1 in another manner. At its bottom the filter fabric is fixed to a suitable bottom piece consisting in the constructional form shown in the drawing of two discs 6 and 7 between which the filter fabric is clamped, the discs being pressed together by a bolt 8 or the like. The discs 6 and 7 may preferably be star-shaped as shown in Fig. 2, thus leaving a proportionally great filtering surface, whereby the folds of the filter will not collapse during the suction. Instead of two plates only one may be employed, to which the fabric is then fixed by sewing it on or in any other way. To the bottom piece stays 9 are fixed reaching to the upper edge of the filter, where they are fixed to a ring 10 or the like.

When the vacuum-brush is assembled, the ring 10 bears against the machine housing 2 and is held in its place e. g. by the projections 11 of the housing (Fig. 1). Of course, the ring 10 may also have a diameter corresponding to the inner diameter of the ring 4 so as to be held in its place by the latter (Fig. 3). Hereby the filter is supported by the stays 9 and the bottom piece so that it cannot collapse by the suction. When the filter is to be cleansed and the dust-container to be emptied, the machine housing 2 is first removed. The ring 10 may then be raised, whereby the stays 9 and the bottom piece 6, 7 come along therewith, so that the filter is turned inside out, the supporting ring 4 being kept close to the dust-container 1. When the dust is, thereafter, shaken from the filter, this may be removed from the dust-container, thus allowing the latter to be emptied.

Instead of a ring 10 other supporting means may be employed for the stays 9, as e. g. a cross head, a cross, a star, or the like. In the constructional form shown in Figs. 3–5 a cross head is employed and there is only one stay bolt 9 placed in the centre line of the filter. The bottom piece 6, 7 here has the shape of a star with eight rays, the discs of which are tightened together by a nut on the end of the stay 9 passing through the discs.

According to Fig. 6 the stays are fixed to a disc 10$^a$, the edge of which is bent and lies close to the supporting ring 4 so as to be held in its place by the latter. The disc 10$^a$ is provided with recesses 10$^b$ for the passage of the suction air. The filter here has the shape of a cone, the top of which is bent in and fixed to the centre of the disc 10$^a$. The filter is stretched by a ring 12 fixed to the lower end of the stays 9, the upper end of which is fixed to the disc 10$^a$. Instead of single stays fixed to a ring a complete cylinder may be employed for supporting the filter. This constructional form affords a very large filtering surface. The disk 10$^a$ is not supported by the machine housing, but is secured to the ring 4 by a bayonet lock joint 13 or similar connection capable of disengagement.

Besides the constructional forms specified hereinbefore and shown in the drawing the filter may be greatly varied without leaving the principle of the invention.

I claim:

1. A filter for vacuum brushes of the kind wherein the filter extends into a dust container and filters dust off on its outer surface, comprising, a dust container, a filter within, and connected to the dust container, and means for turning the filter inside out without wholly removing it from the dust container whereby to permit dust being shaken off the filter and into the container without raising any dust into the air.

2. A filter for vacuum brushes of the kind wherein the filter extends into a dust container and filters dust off on its outer surface, comprising, a dust container, a filter within the dust container, and means for turning the filter inside out without wholly removing it from the dust container whereby to permit dust being shaken off the filter and into the container without raising any dust into the air.

3. A filter for vacuum brushes of the kind wherein the filter extends into a dust container and filters dust off on its outer surface, comprising, a dust container, a filter within the dust container, and means for turning the filter inside out without wholly removing it from the dust container whereby to permit dust being shaken off the filter and into the container without raising any dust into the air, an operating ring, a perforated stretcher plate at the top edge of the filter, stays connecting the bottom of the filter to the stretcher plate, whereby the filter is kept stretched during operation of the vacuum brush, the said means for turning including the ring which is raised from the dust container.

4. A filter for vacuum brushes of the kind wherein the filter extends into a dust container and filters dust off on its outer surface, comprising, a dust container, a filter within the dust container, and means for turning the filter inside out without wholly removing it from the dust container whereby to permit dust being shaken off the filter and into the container without raising any dust into the air, an operating ring, a perforated stretcher plate at the top edge of the filter, stays connecting the bottom of the filter to the stretcher plate, whereby the filter is kept stretched during operation of the vacuum brush, the said means for turning including the ring which is raised from the dust container and means for holding the operating ring in position, including, a filter supporting ring outside of the operating ring, and an annular projecting machine housing shoulder inside of the operating ring.

5. A filter for vacuum brushes of the kind wherein the filter extends into a dust container and filters dust off on its outer surface, comprising, a dust container, a filter within the dust container, and means for turning the filter inside out without wholly removing it from the dust container whereby to permit dust being shaken off the filter and into the container without raising any dust into the air, an operating ring at the top edge of the filter, stays connecting the bottom of the filter to the operating ring, whereby the filter is kept stretched during operation of the vacuum brush, the said means for turning including the ring which is raised from the dust container.

In testimony whereof I affix my signature.

PEDER ANDERSEN FISKER.